April 14, 1964
L. H. FREEDMAN
3,129,416
SPEED ALARM FOR DIAL SPEEDOMETER
Filed Oct. 17, 1960
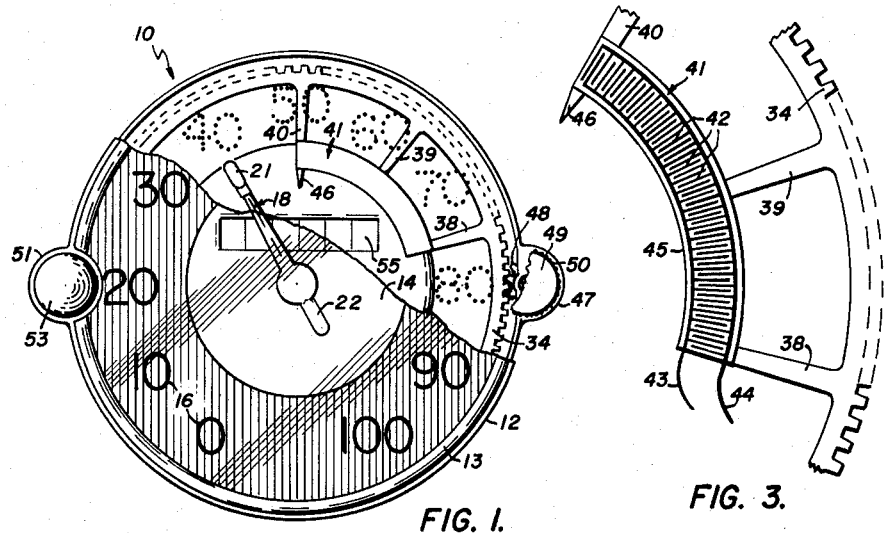
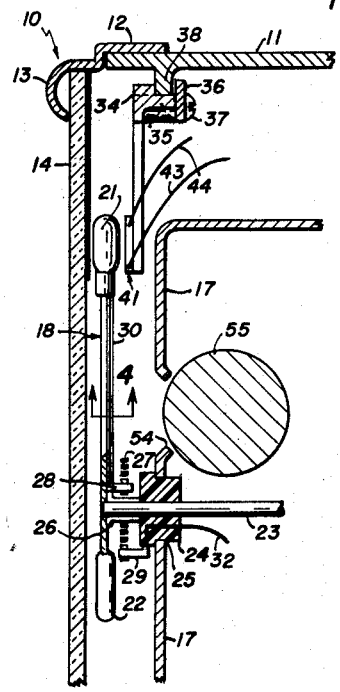
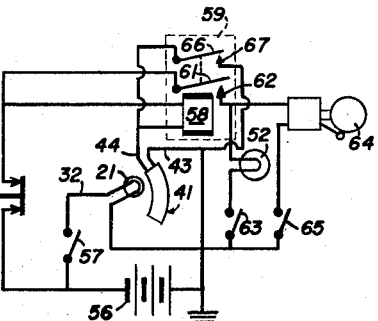
LOUIS H. FREEDMAN
INVENTOR.
BY *Herbert J. Brown*
ATTORNEY United States Patent Office 3,129,416
Patented Apr. 14, 1964

3,129,416
SPEED ALARM FOR DIAL SPEEDOMETER
Louis H. Freedman, 1416 Continental Life Bldg.,
Fort Worth 2, Tex.
Filed Oct. 17, 1960, Ser. No. 63,184
6 Claims. (Cl. 340—263)

This invention relates to automotive safety devices and has reference to a speed alarm system adapted for co-action with a dial type speedometer.

The addition of turnpikes and limited access highways to the interstate highway system in this country, while greatly increasing road capacity and reducing transit time for trucks and automobiles, has increased the monotony of driving and has accentuated the tendency of some drivers unconsciously to increase their speed after prolonged travel. A lack of intersections or other obstructions to traffic when accompanied by road and engine vibrations, also tends to induce sleep in a weary traveler. To warn a driver of his excessive speed or to arouse a dozing driver and thus avert the possibility of a needless accident, various devices have been designed and marketed to sound an alarm when an automobile exceeds or falls below a preset speed. If the mechanism which actuates such an alarm impairs the accuracy of a speedometer, then both the alarm and the speedometer serve to mislead the driver by causing unintentional violations of speed limits and give evidence of safety when, in fact, an automobile may be moving at a dangerous velocity. Mechanical contact and frictional drag between a speedometer mechanism and an alarm system, in general, leads to this shortcoming. The requirement in an alarm system of a conscious act by the driver to discontinue the alarm serves to assure that a driver is aware of a dangerous situation, but in presently known trip systems which may be used to actuate an alarm there remains the danger that the conscious act may, itself, lead to a false sense of security. If an alarm is actuated by excessive speed acquired for good reason, as when one car passes another, the conscious act of a driver in discontinuing the alarm may be performed, in the use of some alarm systems, at a velocity exceeding the preset speed and wherein the tripping mechanism has been passed by the indicator arm of the speedometer; in this case, a driver may continue in the false belief that he is traveling at a safe speed when, in fact, he is exceeding the legal limit.

An object of the present invention is to provide an alarm system for an automobile speedometer and wherein an alarm is actuated by the presence of the pointer arm of a dial speedometer within a given speed range.

Another object of the invention is to provide, in an alarm system for a dial type speedometer, an optical trigger system adjustable for actuation in a variety of speed ranges.

A further object of the invention is to provide an alarm system for a dial type speedometer and wherein there is no frictional engagement between the actuating device of the alarm system and the speedometer mechanism.

A further object of the invention is to provide an alarm system of the type described for a dial speedometer and wherein a conscious act of the driver is required to discontinue the alarm.

An additional object of the invention is to provide an alarm system for coaction with a dial type speedometer and which system not only requires a conscious act of the driver to discontinue the alarm but also re-sounds the alarm if the conscious act is performed while the automobile exceeds a preset velocity.

These and other objects will become apparent from the following description and the accompanying drawing, wherein:

FIGURE 1 is a partially sectional front elevational view of a dial type speedometer equipped with the actuating mechanism of an alarm system as defined herein.

FIGURE 2 is an enlarged and fragmentary side elevational and sectional view of components illustrated in FIGURE 1.

FIGURE 3 is an enlarged and broken front elevational view of the photoconductive cell and ring gear of the invention.

FIGURE 4 is an enlarged view taken along line 4—4 in FIGURE 2.

FIGURE 5 is a schematic diagram of electrical components and circuits of the invention.

In the drawing, a dial type speedometer, generally designated by the numeral 10, is constructed within a cylindrical speedometer case 11 which is adapted for mounting within the dashboard of an automobile and is open at the end facing the driver. A rim 12 is press fit over the open end of the speedometer case 11 and includes an arcuate frame 13 projecting outwardly of the case and extending toward the axis thereof. A transparent cover plate 14 formed in the shape of a disk is mounted within the frame 13 and an annular plate 15 of translucent material having an outer diameter equalling the diameter of the transparent plate 14 is attached to the transparent plate interiorly of the speedometer and is provided with indicia 16 in miles per hour. An opaque plate 17 disposed parallel with but spaced from the transparent plate 14 is positioned within the speedometer 10 and is attached to the speedometer case 11.

An elongate pointer arm 18 is constructed of a single sheet metal strip creased along its longitudinal center line so that longitudinal halves 19 and 20 of the pointer arm form an obtuse angle with respect to one another. A light bulb 21 which may be of the miniature incandescent type is attached to one end of the pointer arm 18 and is so arranged and positioned with respect to the arm that the bulb is positioned behind the translucent plate 15 attached to the back of the front cover plate 14. A counterbalancing member 22 is attached to the other end of the pointer arm, the proper size and weight of the counterbalancing member being determined by the size and effective weight of the remainder of the pointer arm 18. Between opposite ends of the pointer arm 18, but at a position nearer the counterbalance 22 than the light bulb 21, a shaft 23 is perpendicularly attached to the pointer arm with respect to its longitudinal axis and extends away from the pointer arm in a plane bisecting the obtuse angle formed by the longitudinal halves 19 and 20 thereof. The pointer arm is positioned between the front cover plate 14 of the speedometer 10 and the opaque plate 17, and the shaft 23 extends through an insulated bearing 24 positioned within and supported by a centrally located opening 25 in the opaque plate 17 so that the shaft 23 is co-axially positioned with respect to the case 11 and is rotatably supported by the insulated bearing 24. That end of the shaft 23 projecting interiorly of the speedometer case 11 is engaged and supported by a speedometer mechanism (not shown) which may be constructed as any of a variety of commercially available types. Between the pointer arm 18 and the insulated bearing 24 a spacer sleeve 26 is positioned about the shaft 23 and prevents rearward migration of the shaft and pointer arm with respect to the speedometer case 11. A coiled hair spring 27 is spaced from and positioned about the spacer sleeve 26 between the insulated bearing 24 and the pointer arm 18, and a pin 28 affixed to and carried by the pointer arm 18 engages the inner end of the hair spring 27 whereas a second pin 29 attached to the insulated bearing 24 engages the outer end of the hair spring. An insulating filler 30 which may be formed of India rubber or a suitable resin is attached to the inner face of the pointer arm 18 at the junction of the obtusely disposed longitudinal halves 19 and 20 thereof and extends from the shaft 23 to the light bulb 21. Within the insulating filler 30 a conductor wire 31 of small diameter extends from the pin 28, attached to the pointer arm 18, to the light bulb 21. The conductor 31 makes electrical contact with one terminal of the light bulb 21 and with the hair spring 27 but is electrically insulated from the remainder of the pointer arm 18. In like manner, an electrical lead 32 extends through the insulated bearing 24 and makes electrical contact with the pin 29 supported by the insulated bearing but is not in electrical communication with the opaque plate 17. The pointer arm 18 and shaft 23, being in electrical contact with one another, constitute one electrical conductor for the light bulb 21 whereas the conductor wire 31, pins 28 and 29, hair spring 27 and electrical lead 32 comprise a second conductor for the light bulb 21; these two conductors constitute a circuit path for the light bulb 21 but do not impair operation or accuracy of the pointer arm in its coaction with the speedometer mechanism (not shown).

A spline 33 projecting interiorly of the case 11 and integrally formed as a part thereof is spaced rearwardly of the pointer arm 18 and defines a plane parallel with the path of revolution of the light bulb 21 on the end of the pointer arm. A ring gear 34 is positioned adjacently and forwardly of the spline 33 within the case 11 and a collar 35 having an outside diameter slightly less than the outside diameter of the ring gear 34 is integrally constructed with and projects rearwardly of the ring gear; the collar 35 is positioned adjacently within and journaled to the spline 33. A backing ring 36 is attached by screws 37 to the rearward end of the collar 35 and secures the collar to its journaled mounting within the spline 33. A plurality of supporting arms 38, 39 and 40 project radially and interiorly of the ring gear 34 and are regularly spaced from one another within one quadrant of the ring gear. An arcuately shaped photoconductive cell 41 is attached to and supported by the inner ends of the supporting arms 38, 39 and 40 in a plane rearwardly spaced from the path of the light bulb 21 but parallel therewith. As best illustrated in FIGURE 3, the photoconductive cell 41 may be constructed of a plurality of regularly spaced and radially disposed conductor strips 42 connected in alternating arrangement to one of two electrical leads 43 and 44 all of which are mounted on the forward side of a rigid arcuate plate 45 and covered with a suitable photoconductive substance such as activated cadmium sulphide. It is to be understood that the present invention is not directed to a particular form or method of construction of a photoconductive cell and that any type of photoconductive device, susceptible to fabrication as an arcuate strip, might be adapted for use with the present invention. As best illustrated in FIGURE 1, the photoconductive cell is positioned behind the translucent plate 15 of the speedometer 10 and opposite the path of displacement of the light bulb 21 so that the photoconductive cell is shielded from extraneous light and responsive only to direct illumination from the bulb 21. A pointer 46 projects from one end of the photoconductive cell 41 radially and interiorly of the inner edge of the translucent plate 15 where it may be viewed by a driver through the transparent plate 14.

An ear 47 is constructed on one side of the case 11 near the forward end thereof, and a pinion 48 mounted withing the ear is positioned for toothed engagement with the ring gear 34. A knob 49 coaxially attached to the pinion 48 projects forwardly thereof and exteriorly of the ear 47 and is provided with knurling upon its periphery to facilitate its manipulation by hand. A second ear 51 is exteriorly constructed as part of the case 11 at the opposite side thereof and serves as a housing for an alarm light 52 (FIGURE 5). A dome 53 of colored glass covers and conceals the alarm light 52 when the same is not in operation. A window 54 may be provided at any convenient location in the opaque plate 17 to permit display of conventional mileage indicator wheels 55.

The light bulb 21 on the end of the indicator arm 18 and the photoconductive cell 41 coact with one another and with other electrical components to provide a speed alarm system for an automobile. Following the generally adopted practice of grounding one terminal of a storage battery to the chassis of an automobile, the shaft 23 of the speedometer 10 is electrically connected to the automobile chassis as shown schematically in FIGURE 5. The other electrical lead 32 of the light bulb 21 is connected to one terminal of a single pole single throw switch 57 which has its other terminal in electrical contact with the ungrounded terminal of the battery 56. One lead 43 of the photoconductive cell 41 is likewise attached to the grounded terminal of the battery 56 and the other lead 44 of the photoconductive cell is wired through the coil 58 of a double pole single throw relay 59 to one contact point of a normally closed push button type switch 60; the other contact point of the switch 60 is electrically connected to the ungrounded terminal of the battery 56. The first pole 61 of the relay 59 is also wired to the ungrounded terminal of the battery 56 through the push button type switch 60 and the contact point 62 of the first pole 61 of the relay 59 is wired through the alarm light 52 and a single pole single throw switch 63 to the grounded terminal of the battery 56. An audible alarm 64, such as a bell or buzzer, is wired in parallel with the alarm light 52 and the alarm light switch 63 and is wired in series with an audible alarm switch 65 which is also of the single pole single throw type. The second armature 66 of the relay 59 is electrically connected to the ungrounded lead 44 of the photoconductive cell 41 and the contact point 67 of the second armature is wired to the grounded terminal of the battery 56.

In operation, the switch 57 of the light bulb 21 is closed when a driver wishes to use his alarm system and either or both of the switches 63 and 65 of the alarm light 52 and audible alarm 64 may be closed. By manipulation of the knob 49 at the ear 47 of the speedometer 10 the ring gear 34 may be rotated in its journaled mounting within the spline 33 until the pointer 46 at one end of the photoconductive cell 41 is positioned opposite indicia 16 corresponding to the maximum speed limit which a driver wishes to set for his own safety. One end of the photoconductive cell 41 is thus positioned for actuation when the pointer arm reaches a preset velocity indication and the light bulb carried by the pointer arm actuates the alarm system. It will be noted, however, that the remainder of the photoconductive cell extends beyond this preset point with respect to the speed indicated by the pointer arm 21 and covers an additional velocity span of about 25 miles per hour. When and if the light bulb 21 of the pointer arm 18 is carried to the preset velocity it illuminates part of the photoconductive cell 41 and, by reducing the internal resistance of the photoconductive cell, permits sufficient current to flow through the coil 58 of the relay 59 to attract the armatures 61 and 66 thereof. The first armature 61 of the relay, upon closing, completes the circuits of the alarm light and audible alarm 52 and 64 (assuming their respective switches 63 and 65 have been closed) and the second armature of the relay serves as a shunt bypassing the photoconductive cell 41 and holding the relay in its closed position. To discontinue the alarm, the driver must perform a conscious act; that is, he must push the normally closed button type switch 60 to interrupt the coil circuit of the relay. Should the velocity of the automobile exceed the preset limit when the driver operates the push button switch 60 the light bulb 21 on the end of the pointer arm 18 will be positioned opposite another part of the photoconductive cell 41 and release of the button will once again operate the alarm system as previously described. Only if the velocity of the automobile exceeds the preset limit by a speed exceeding the span of the photoconductive cell 41, will the alarm system fail to indicate the continuation of a dangerous driving condition; as a practical matter, the requirement of a conscious act by the driver and a span of the photoconductive cell approximating 25 miles per hour serve as adequate insurance that a driver will be made aware of hazards assumed.

Frictional impairment of the accuracy of the speedometer is avoided by use of the hair spring 27, a functional part of the speedometer mechanism, as a conducting path for the light bulb 21 on the end of the pointer arm 18; use or disuse of the alarm system has no effect upon the reliability of the speedometer mechanism. Actuation of the relay 59 is optically accomplished and there is no making or breaking of electrical contacts which might otherwise be mounted on or carried by the pointer arm 18 of the speedometer.

The invention is not limited to the exemplary construction herein shown and described, but may be made in various ways within the scope of the appended claims.

What is claimed is:

1. In combination with a dial type speedometer including a case and having a movable pointer arm within said case, a speed alarm comprising a light bulb mounted in said case to move with said pointer arm, means in said case activating said light bulb, an arcuate photosensitive strip movably positioned within said case in proximate spaced relationship to the path of said bulb, an electrical warning signal, and means electrically connecting said signal with said photosensitive strip.

2. A speed warning device as defined in claim 1, including a ring gear positioned within said case and rotatably and coaxially disposed with respect to the axis of rotation of said pointer arm, a plurality of supporting members extending between and secured to said ring gear and said photoconductive strip, a pinion rotatably mounted for intermeshing engagement with said ring gear, and manual means adjustably rotating said pinion.

3. The invention as defined in claim 1 and wherein said means electrically connecting said signal with said photoconductive cell includes: a latching relay having its coil wired in series with said photoconductive strip, a normally closed switch wired in series with said photoconductive strip and said coil of said relay, and means electrically connecting a normally open armature circuit of said relay in series with said warning signal.

4. The invention as defined in claim 3 and wherein said armature of said relay is wide in parallel with said photoconductive strip and said coil of said relay but in series with said switch.

5. In a dial type speedometer including a case and a pointer arm, a speed warning device comprising: a light bulb mounted on said pointer arm, means electrically connecting said pointer arm to one terminal of said bulb, an electrical conductor carried by but electrically insulated from said pointer arm and electrically connected to the other terminal of said bulb, means electrically connecting said pointer arm and said electrical conductor to a source of electrical current, an arcuate photoconductive strip proximately spaced from but in axial alignment with said bulb, means adjustably supporting said photoconductive strip, and means electrically connecting said photoconductive strip to the actuating circuit of an electrical alarm.

6. In combination with a dial type speedometer including a case and having a movable pointer arm within said case, a speed alarm comprising a light bulb mounted in said case to move with said pointer arm, means in said case activating said light bulb, an arcuate photosensitive strip positioned within said case in proximate spaced relationship to the path of said bulb, an electrical warning signal, and means electrically connecting said signal with said photosensitive strip.

References Cited in the file of this patent

UNITED STATES PATENTS

| | | |
|---|---|---|
| 1,988,658 | Kovalsky | Jan. 22, 1935 |
| 2,337,535 | Acs | Dec. 28, 1943 |
| 2,433,895 | Fairhurst | Jan. 6, 1948 |
| 2,538,218 | Treese | Jan. 16, 1951 |
| 2,771,597 | Freedman | Nov. 20, 1956 |
| 2,979,628 | Gaon | Apr. 11, 1961 |